(12) United States Patent
Graichen

(10) Patent No.: US 9,073,150 B2
(45) Date of Patent: Jul. 7, 2015

(54) METHOD FOR MANUFACTURING A COMPONENT BY SELECTIVE LASER MELTING

(75) Inventor: Andreas Graichen, Norrköping (SE)

(73) Assignee: SIEMENS AKTIENGESELLSCHAFT, München (DE)

( * ) Notice: Subject to any disclaimer, the term of this patent is extended or adjusted under 35 U.S.C. 154(b) by 161 days.

(21) Appl. No.: 13/813,968

(22) PCT Filed: Jul. 20, 2011

(86) PCT No.: PCT/EP2011/062457
§ 371 (c)(1),
(2), (4) Date: Apr. 12, 2013

(87) PCT Pub. No.: WO2012/016836
PCT Pub. Date: Feb. 9, 2012

(65) Prior Publication Data
US 2013/0199013 A1    Aug. 8, 2013

(30) Foreign Application Priority Data
Aug. 5, 2010 (EP) ..................... 10008192

(51) Int. Cl.
| | |
|---|---|
| *B23P 6/00* | (2006.01) |
| *B23K 26/30* | (2014.01) |
| *B22F 9/24* | (2006.01) |
| *B23K 26/08* | (2014.01) |
| *B23K 26/34* | (2014.01) |

(Continued)

(52) U.S. Cl.
CPC ......... *B23K 26/422* (2013.01); *Y10T 29/49732* (2015.01); *Y10T 29/49336* (2015.01); *Y10T 29/49318* (2015.01); *Y10T 29/49742* (2015.01); *B22F 9/24* (2013.01); *B22F 2998/10* (2013.01); *B23K 26/0807* (2013.01); *B23K 26/34* (2013.01); *B23P 6/00* (2013.01); *H05B 6/10* (2013.01); *B23K 26/3206* (2013.01); *B23K 26/3293* (2013.01)

(58) Field of Classification Search
CPC ............. B23K 26/422; B23K 26/3206; B23K 26/3293; B23K 26/0807; B23K 26/34; B23P 6/00; B22F 2998/10; B22F 9/24; H05B 6/10
USPC ........ 29/889.1, 889.7, 889.2, 402.09, 402.16, 29/402.18, 402.19, 402.21; 427/543
See application file for complete search history.

(56) References Cited

U.S. PATENT DOCUMENTS

| | | | |
|---|---|---|---|
| 4,818,562 A * | 4/1989 | Arcella et al. ................. | 427/597 |
| 5,597,589 A | 1/1997 | Deckard | |
| 8,584,357 B2 * | 11/2013 | Richter et al. ............... | 29/889.7 |

(Continued)

FOREIGN PATENT DOCUMENTS

| | | |
|---|---|---|
| CN | 1074160 A | 7/1993 |
| CN | 1439476 A | 9/2003 |

(Continued)

*Primary Examiner* — Ryan J Walters

(57) ABSTRACT

A method of manufacturing a component by selective laser melting and to provide heat treatment to the component is provided. The method includes building a heat treatment device adapted to provide a heat treatment to the component as part of the same selective laser melting for manufacturing the component and providing a heat treatment to the component by the heat treatment device.

17 Claims, 7 Drawing Sheets

(51) Int. Cl.
*H05B 6/10* (2006.01)
*B23K 26/32* (2014.01)

(56) References Cited

U.S. PATENT DOCUMENTS

2001/0014403 A1 8/2001 Brown et al.
2004/0026807 A1 2/2004 Andersson et al.
2010/0151145 A1* 6/2010 Richter et al. ................ 427/543

FOREIGN PATENT DOCUMENTS

| | | |
|---|---|---|
| CN | 1883872 A | 12/2006 |
| JP | 2004-122490 A | 4/2004 |
| JP | 2004-130314 A | 4/2004 |
| WO | WO 0181031 A1 | 11/2001 |
| WO | WO 2010026397 A1 | 3/2010 |

* cited by examiner

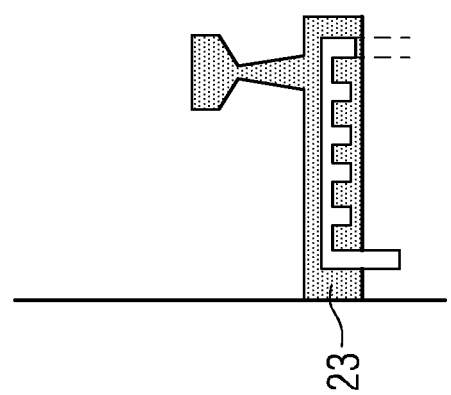
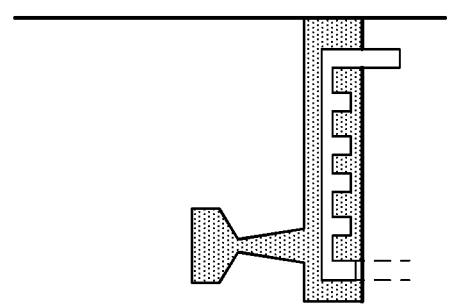
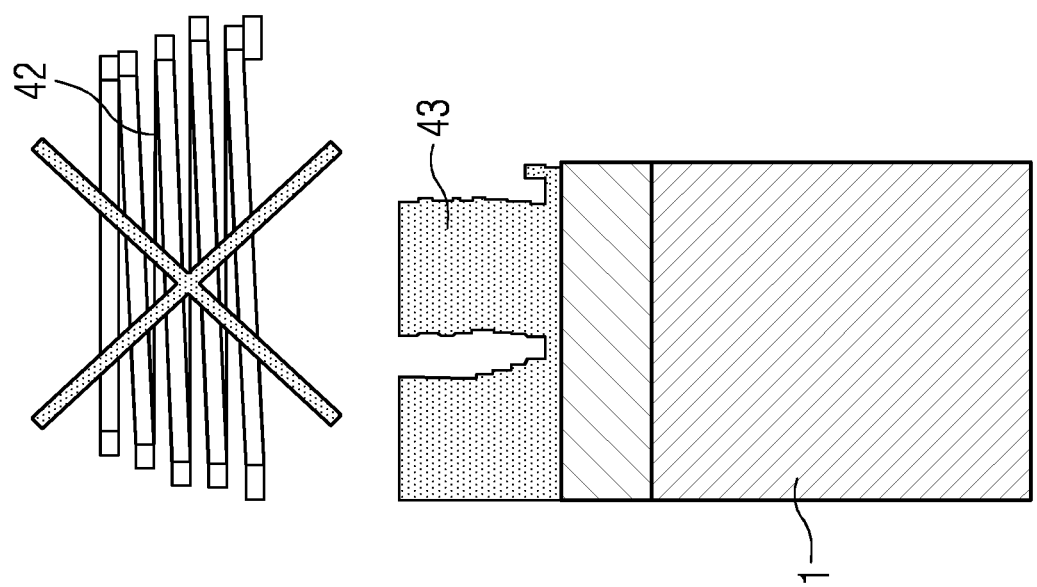
FIG 7

METHOD FOR MANUFACTURING A COMPONENT BY SELECTIVE LASER MELTING

CROSS REFERENCE TO RELATED APPLICATIONS

This application is the US National Stage of International Application No. PCT/EP2011/062457, filed Jul. 20, 2011 and claims the benefit thereof. The International Application claims the benefits of European application No. 10008192.6 filed Aug. 5, 2010. All of the applications are incorporated by reference herein in their entirety.

FIELD OF INVENTION

The present invention relates to a method of manufacturing a component by selective laser melting (SLM) process, particularly on the manufacturing and further heat treatment of the component.

BACKGROUND OF INVENTION

Selective laser melting (SLM) is a manufacturing technique that uses a laser to fuse metallic or non metallic powders finally creating a 3-dimensional object. The laser selectively fuses powdered material by scanning cross-sections generated from a 3-Dimensional digital description of the component (for example from a programmed computer file) on the surface of a powder bed. After each cross-section is scanned, the powder bed is lowered by one layer thickness, a new layer of material is applied on top, and the process is repeated until the component is completely manufactured.

With today's well documented SLM technology, devices or products can be repaired or material can be added onto a device or product surface. SLM usually takes place in a SLM process chamber with controlled atmosphere and with or without elevated working temperature. As SLM is a localized melting process, heat input into a component or product cannot be avoided when adding material onto a device or product surface, even if it can be controlled and limited.

In SLM process, certain materials or material combination that became part of the component during the SLM could turn out to have more or less desirable material properties. To avoid any types of undesirable material properties, the components sometimes require heat treatment or they would benefit from a consecutive post-process heat treatment. On the other side, in the case of a repair of an existing devices or products, there could be multiple elements inside these devices or products that are very much sensitive to the high temperatures. These components are affected in a negative way by heat input and especially by a post-process heat treatment of the component built on them. Often the component produced by SLM is heat treated in a separate setup or arrangement or by using a furnace in a controlled temperature environment.

SUMMARY OF INVENTION

It is an object of the present invention to provide an effective and economical method of providing local heat treatment within a SLM process.

The said object is achieved by providing a method for manufacturing a component by selective laser melting.

The underlying idea is to build a heat treatment device, which is very much adapted to a component and which is used to provide heat treatment to the component that is manufactured by SLM as part of the same SLM process for manufacturing of said component. The advantage here is to have the possibility of providing heat treatment, after the component is manufactured by the SLM process with the help of a specifically adapted heat treatment device used only for the component in question. The method avoids any separate device for providing the heat treatment, thereby making the process cost effective and fast by reducing the time for manufacturing.

SLM is a layer by layer process. The built up of the heat treatment device during the same process of selective laser melting of the component using the same laser fusible powder material used for the manufacture of the component makes the method more adapted to the component. For example, the heat treatment device which is built up can have a profile, very much similar to the shape of the component which is being manufactured, thereby making the heat treatment effective, when the heat treatment device is active. In said method, the built up of the heat treatment device also will be over by the time the component is finished.

In a preferred embodiment, the heat treatment device is spatially positioned in relation to the component, such that said heat treatment device is adapted to provide the heat treatment to the component. The component and the heat treatment device are relatively positioned in proximity so as to have a heat transfer between them, enabling the supply of required heat treatment when the heat treatment device is active. The heat treatment can be either by radiation or induction.

In an alternative embodiment, the component is made of an electrically and thermally conductive material. This enables to create an induced current in the component and thereby generate heat for the heat treatment of the component when the heat treatment device is active.

In an alternative embodiment, the heat treatment device is coil shaped and circumferentially encloses the component. The arrangement is such that if an axis could be defined, around which the spiral shaped heat treatment device is buildup, then said axis passes through the component which is manufactured. This arrangement helps to produce an electromagnetic field inside the component facilitating the phenomena of electro magnetic induction, when an alternating current is passed through the heat treatment device.

In an alternative embodiment, the component is manufactured onto a device, for repairing said device. This enables the application of the said method in device repair, for example in applications like repair of damaged turbine blades or gas turbine burners.

In another alternative embodiment, the method further comprises providing cooling to the device by a cooling arrangement. If materials are used to be added onto or repair a device or product, the problem arises that certain volumes of device or product must be heated and other areas cooled in order to avoid negative effects of the heat on the device or product. The cooling arrangement helps to provide the required cooling to the required region in the device. The cooling means can be a heat exchanger.

In another alternative embodiment, the cooling arrangement further comprises a holder for holding the component and having an integrated cooling channel through which a cooling medium flows. The holder is basically a part of the cooling arrangement. The cooling medium flowing through the integrated cooling channel basically cools the holder. The holder further absorbs and radiates out the conductive heat transferred to the device during the SLM process and heat treatment.

In another alternative embodiment, the holder is made of an electrically and magnetically insulating material. This enables the holder not to pass on the electric current to the device to be repaired or manufactured in any way, which might damage the sensitive elements in the device or to prevent any induced current into the holder.

In another alternative embodiment cooling is provided to the device during SLM of the component and heat treatment of the component. Elevated temperatures at the beginning of a SLM process are often beneficial to improve the fusion to the starting platform. Also SLM process involves high energy beams that generates high amount of heat. The heat transfer to the critical areas in said device is controlled by the cooling process. For example, this can be achieved by operating the integrated cooling channels in the holder device which acts as heat exchangers. To some extent the metallic powder used for the fusion in the SLM process also can absorb heat and thereby act as a cooling mechanism. When the heat of this powder becomes too much, the heat exchanger could be switched to the cooling mode.

In another alternative embodiment, the heat treatment is provided after SLM of the component. This ensures that the heat treatment is done once the component is manufactured so as to make the component devoid of any unwanted material property. For example, like ductility instead of embrittlement.

In another alternative embodiment, building the heat treatment device comprises supporting a base of said heat treatment device by the holder. This enables the holder to act as a platform on which the heat treatment device is built.

In another alternative embodiment, supporting said heat treatment device by the holder comprises supporting said heat treatment device at its base by an extended region of a the holder, said extended region having a specific height and a flat surface with metallic surface coating encircling the component. The height of the extended region defines a minimum offset, up to which a metallic powder is filled in a SLM chamber, while providing the heat treatment. The metallic surface coating further enables the buildup of the heat treatment device on top of the non-metallic holder.

In another alternative embodiment, heat treatment is performed in a SLM chamber. This makes the whole heat treatment process simple by avoiding the component or the repaired device taken to a different external environment other than the SLM chamber for heat treatment, which if done generally involves more effort and time.

In another alternative embodiment, the heat treatment is an inductive heat treatment. In a device that needs to be repaired, there will be multiple elements which are very sensitive to electric current that could be damaged if high electric current is passed directly. Inductive heat treatment ensures that there is no physical contact of the component with the heat treatment device thereby avoiding these unwanted conditions. Also the amount of heat required for the heat treatment is controlled using an alternating current that is generally passed through the heat treatment device rather than in the component directly.

In another alternative embodiment, heat treatment is a contactless heat treatment. This enables the heat treatment device to act as a contactless heating coil to supply the required heat to the component during the heat treatment.

BRIEF DESCRIPTION OF THE DRAWINGS

The present invention is further described hereinafter with reference to illustrated embodiments shown in the accompanying drawings, in which:

FIG. 7 illustrates the final repaired device taken out from the SLM process chamber arrangement.

DETAILED DESCRIPTION OF INVENTION

The practical application of the invention can be found in, but not limited to the manufacture and repair of hot-gas components in a gas turbine or other high temperature applications. For example, turbine blades nevertheless are subject to damage as a result of operation in the gas turbine engines. This damage can be both mechanical in nature as well as metallurgical in nature. Turbine blades are expensive to produce, so that it is desirable from an economic standpoint to repair the blades rather than replace them whenever possible.

Figure 1:
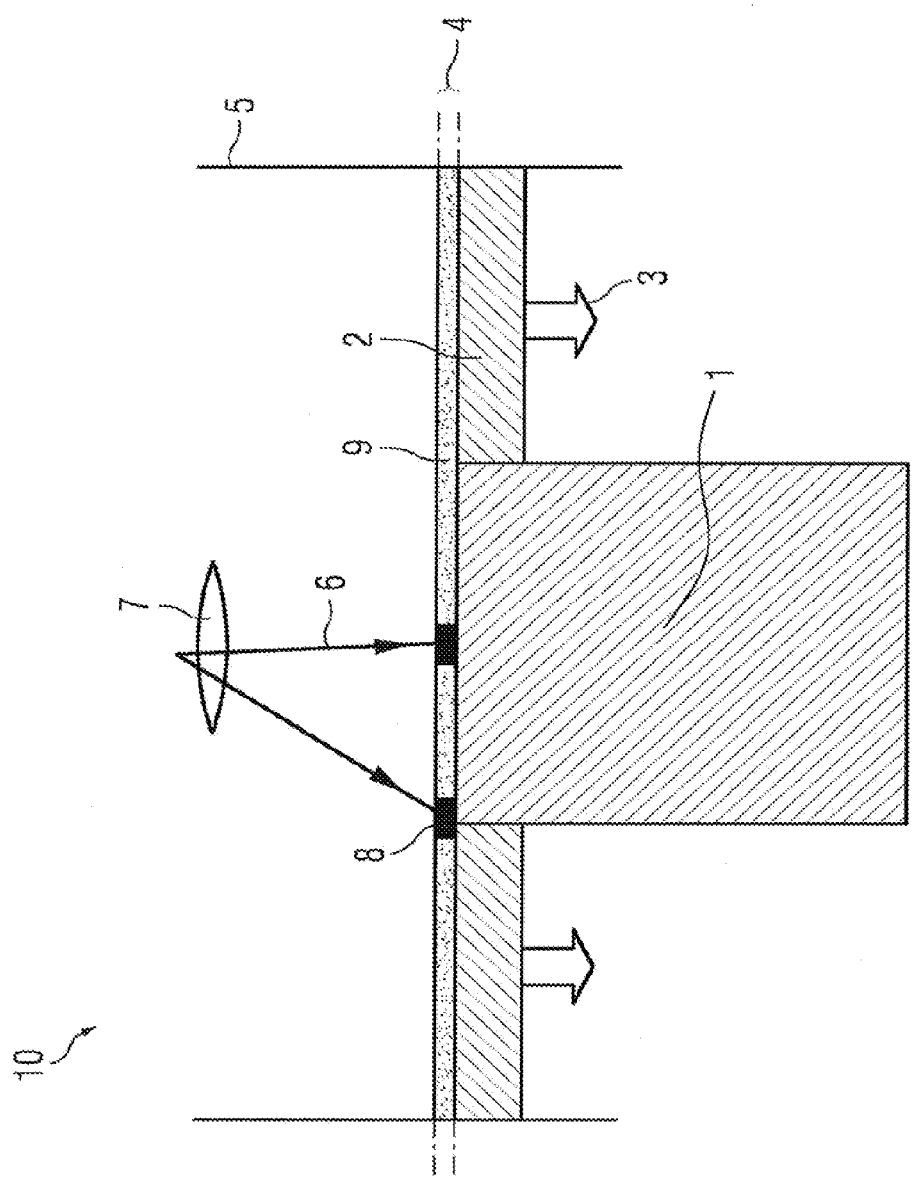
FIG. 1 illustrates the cross section of a SLM process chamber arrangement in prior art, for additive manufacturing of a device to be repaired.

FIG. 1 illustrates the cross section 10 of a SLM process chamber arrangement in prior art, for performing SLM of a device to be repaired. Device 1 is an item to be repaired, perceived without specific requirements concerning heat treatment or cooling. FIG. 1, shows a SLM set-up for repair, shown when first metallic powder layer, for example powder made of alloys or super alloys, is applied to the surface of the device. The arrangement has got a holder 2 specifically adapted for holding the device or product to be repaired. The holder circumferentially holds the device in place for the SLM process. During the SLM process, the holder is moved down in steps shown by the arrow 3 to enable the SLM of multiple layers on the device. In said arrangement a layer 4, with a specific thickness for example 20 or 30 microns or even more based on the requirement is laid over the surface of the device to be repaired. The actual SLM happens inside a process chamber 5, where a laser beam 6 from an optical system 7, produces a local melting spot 8 where the metallic powder 9 is fused to an underlying material or substrate of the device to be repaired. Typically, the process chamber 5 is filled by an inert gas to avoid oxidation of the local melt pool during the process. In the said scenario the first layer is fused on top of the surface of the device to be repaired and then on top of the just previously sintered layer, repeatedly till the whole component is built up.

Practically, the portion of the device that needs a repair would more or less be a small area when compared to the whole device. Generally, for the repair using SLM the device should undergo a pre-preparation to start the SLM process. It is common to mill off or grind off the region to be repaired, before rebuilding the same or upgrading or changing the geometry by the SLM process.

Figure 2:
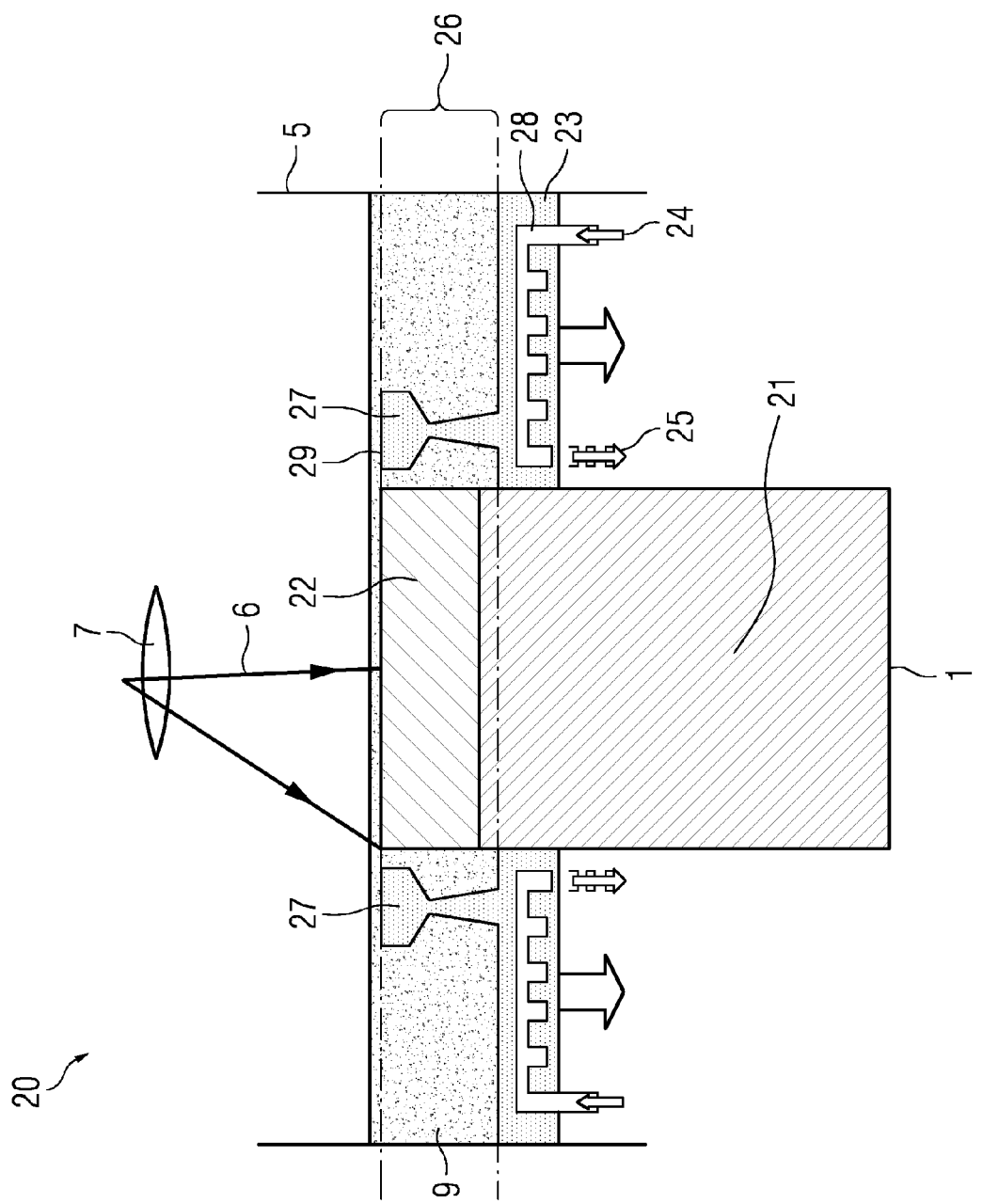
FIG. 2 illustrates the cross section of a SLM process chamber arrangement of the proposed SLM process according to one embodiment of the invention prior to actual additive manufacturing.

FIG. 2 illustrates the cross section 20 of a SLM chamber arrangement of the proposed SLM process according to one embodiment of the invention prior to actual SLM. The arrangement shows the setup of the proposed SLM process, after one powder layer is applied. Device 1 is the corresponding component shown in FIG. 1, which needs to be repaired and which is perceived with specific requirements concerning local heat treatment and local cooling. A first section 21 is the region in the device 1 which shall remain relatively cool, since this section could include heat sensitive elements, for example like sensors, surface coatings that need protection or materials that respond to heat treatment with decreased material properties. Because of the heat there is possibility of the section getting oxidized, deformed or developing bend. Hence to avoid this unwanted issues, cooling of the region is required, which is provided by a cooling arrangement. The device 1 has got a second section 22, which requires moderate post-process heat treatment since it is going to be the heat affected region during the SLM process. In the arrangement, the cooling arrangement is shown to have a specifically modified holder 23. The integrated cooling channels 28 are formed, to accommodate a cooling inlet 24 to let a cooling medium into the holder and a cooling drain 25, for draining out cooling medium from the holder 23. The holder 23 circumferentially encloses the device 1. During the SLM process or at the subsequent heat treatment, or at both the times the cooling medium absorbs heat conducted into the cooling medium through the holder 23. The hot cooling medium is then continuously drained out and fresh supply of cooling medium is maintained using a reservoir and supply mechanism, which is not shown in the FIG. 2. The cooling medium could be a gas or a liquid. The holder 23 is made of an electrically and magnetically insulating material. For example, the material used could be, but not limited to plastic, bakelite or ceramic. The holder 23 comprises an extended region 27 circumferentially encircling the device 1, having a metallic surface coating 29 on the top flat surface, which can support the buildup of a heat treatment device, which will be discussed further. The cross section of the extended region 27 is seen in the shape of a symmetrical "cup" in the FIG. 2, but could also be realized in some other shape too. The height of the extended region defines a minimum offset 26, up to which a metallic powder 9 is filled in the SLM chamber 5.

The offset 26 is so adjusted and chosen to provide a layer of the metallic powder 9 on top of the device 1, for SLM to happen when the laser beam scans through the metallic powder 9. The metallic powder 9 forms a layer on top of the device 1 once the SLM of the layer is done. The metallic surface coating 29 further enables the built up of the heat treatment device on top of the holder 23 which is generally non-metallic. The bed formed by the metallic powder 9 also protects the heat sensitive section of the device 1 by providing both electrical and thermal insulation. The height of metallic powder bed, which is the offset 26, can be controlled to provide the said protection.

Figure 3:
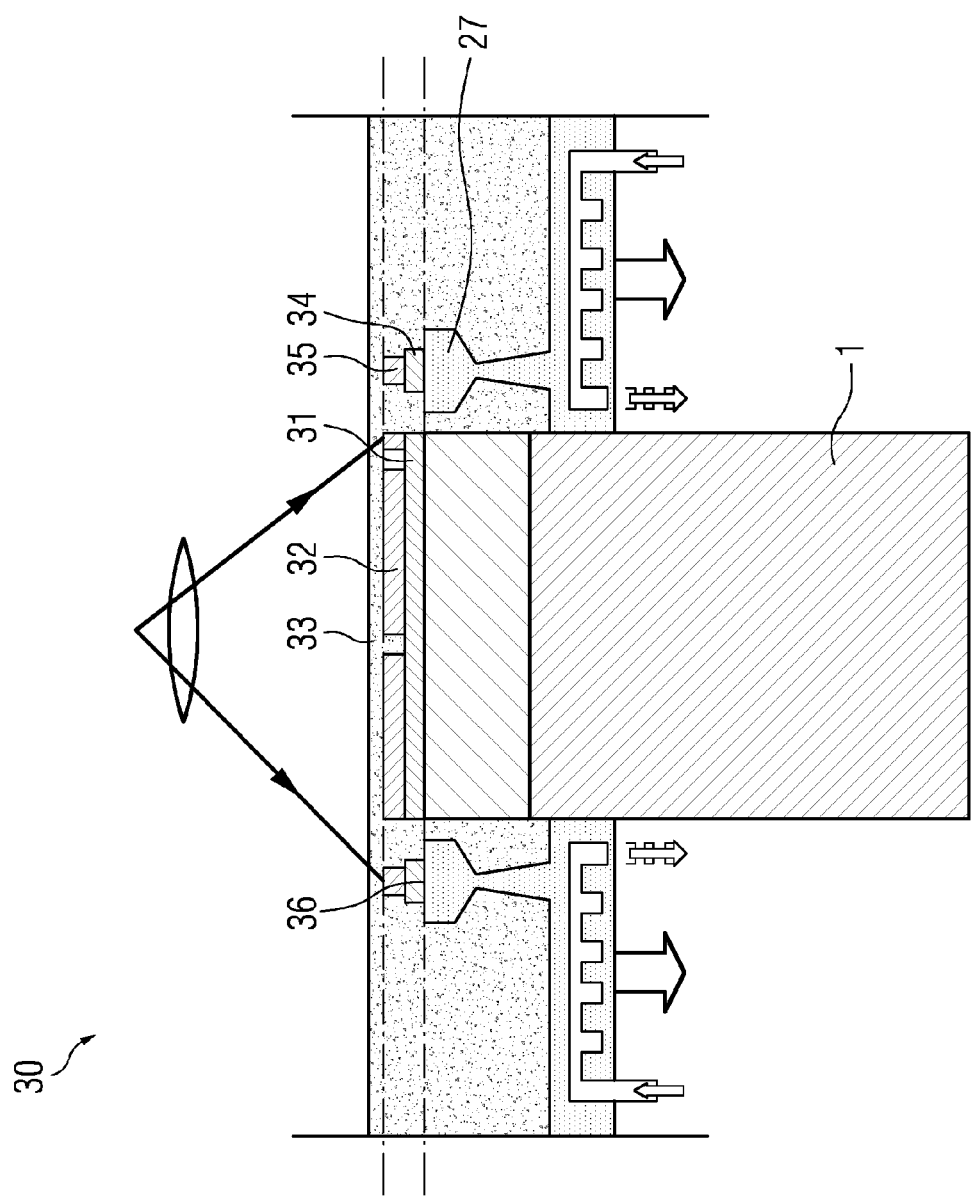
FIG. 3 illustrates the cross section of a SLM process chamber arrangement showing the buildup of the proposed heat treatment device along with the repair of the device by SLM.

FIG. 3 illustrates the cross section 30 of a SLM chamber arrangement showing the buildup of the proposed heat treatment device along with the repair of the device by SLM. The SLM set-up in FIG. 3, shows two layers, i.e. layer 31 and layer 32 which are added to the device 1 to form part of a component that need to be manufactured on the said device 1 as part of the repair process. A third layer 33 is already applied, which will form part of the component, when fused by SLM. Simultaneously during the SLM of the layer 31, another layer 34 is built around the component, having its base 36 on the flat surface of the extended region 27 of the holder 23. Similarly during the SLM of the layer 32, another layer 35 is built around the component. During SLM, the holder 23 is supplied with continuous supply of the cooling medium to cool the desired section of the device 1.

Figure 4:
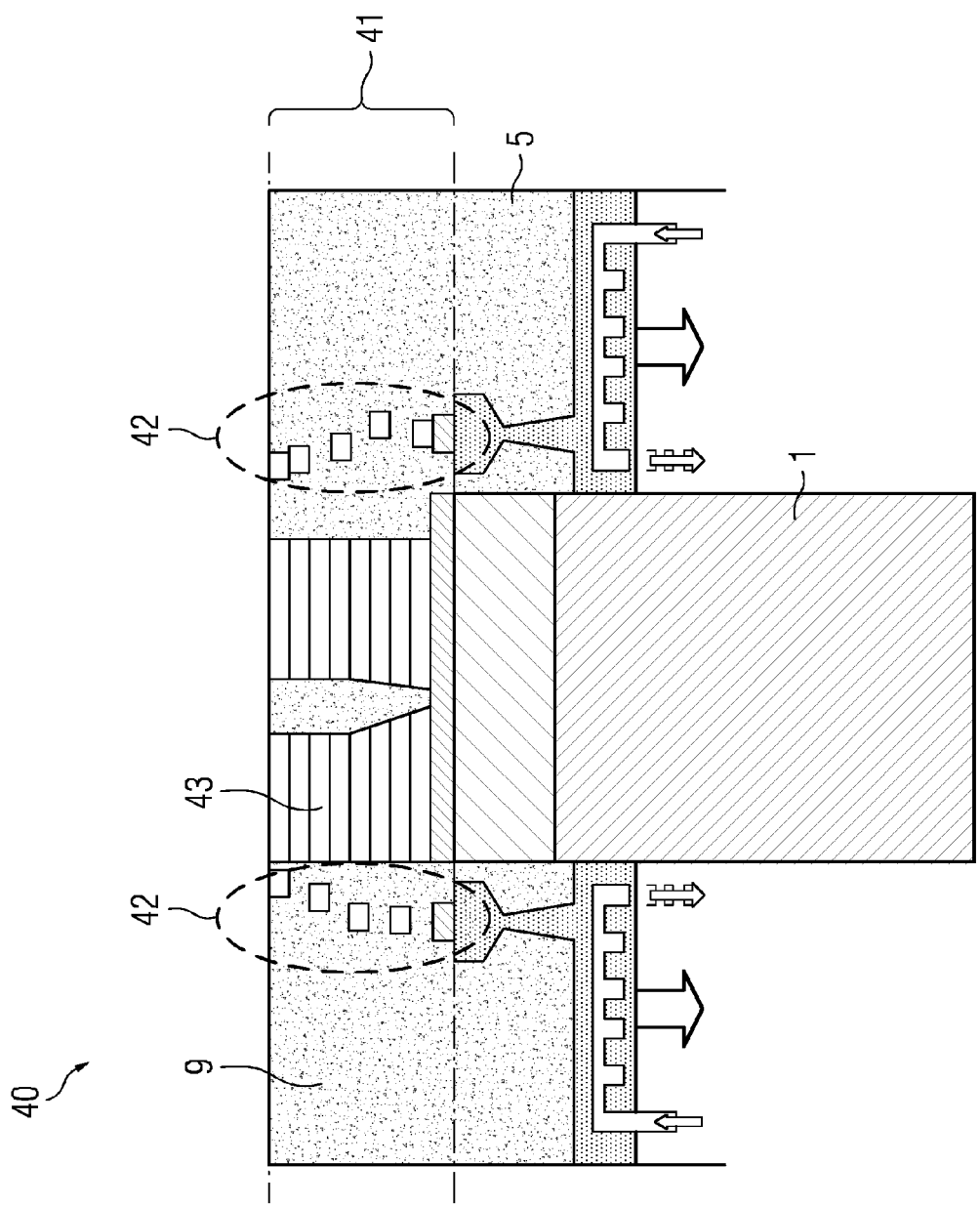
FIG. 4 illustrates the cross section of a SLM process chamber arrangement showing the buildup of the proposed heat treatment device at the end of the SLM repair process.

FIG. 4 illustrates the cross section 40 of a SLM chamber arrangement showing the buildup of the proposed heat treatment device at the end of the SLM repair process. The SLM set-up is shown for repairs, after the end of SLM repair process with the SLM process chamber 5 still completely filled with metallic powder 9. The holder device is continuously cooled during the process. The buildup of heat treatment device 42 gets completed with the end of the SLM of the component in the SLM repair process. Finally the heat treatment device which gets built on the holder 23 will be of any desired coil shape. The heat treatment device 42 is spatially positioned in relation to the sintered component 43, such that said heat treatment device 42 can provide the heat treatment to the component 43 without directly coming in contact with the component 43. The coil shaped heat treatment device 42 circumferentially encloses the component 43. The arrangement shows the heat treatment device 42 in cross section, which is built circumferentially around the component 43. The component 43 is shown to have multiple layers added on top of the device 1 to be repaired. The regions where the SLM is required for the buildup of the heat treatment device 42 can be controlled based on the shape of the component 43 to be manufactured, so as to have a similar profile build around the component 43 to have an effective heat treatment, when the heat treatment device 42 is active.

The metallic powder 9 gets accumulated in the SLM chamber 5 forming a layer 41, which corresponds to the height of the buildup heat treatment device 42.

Figure 5:
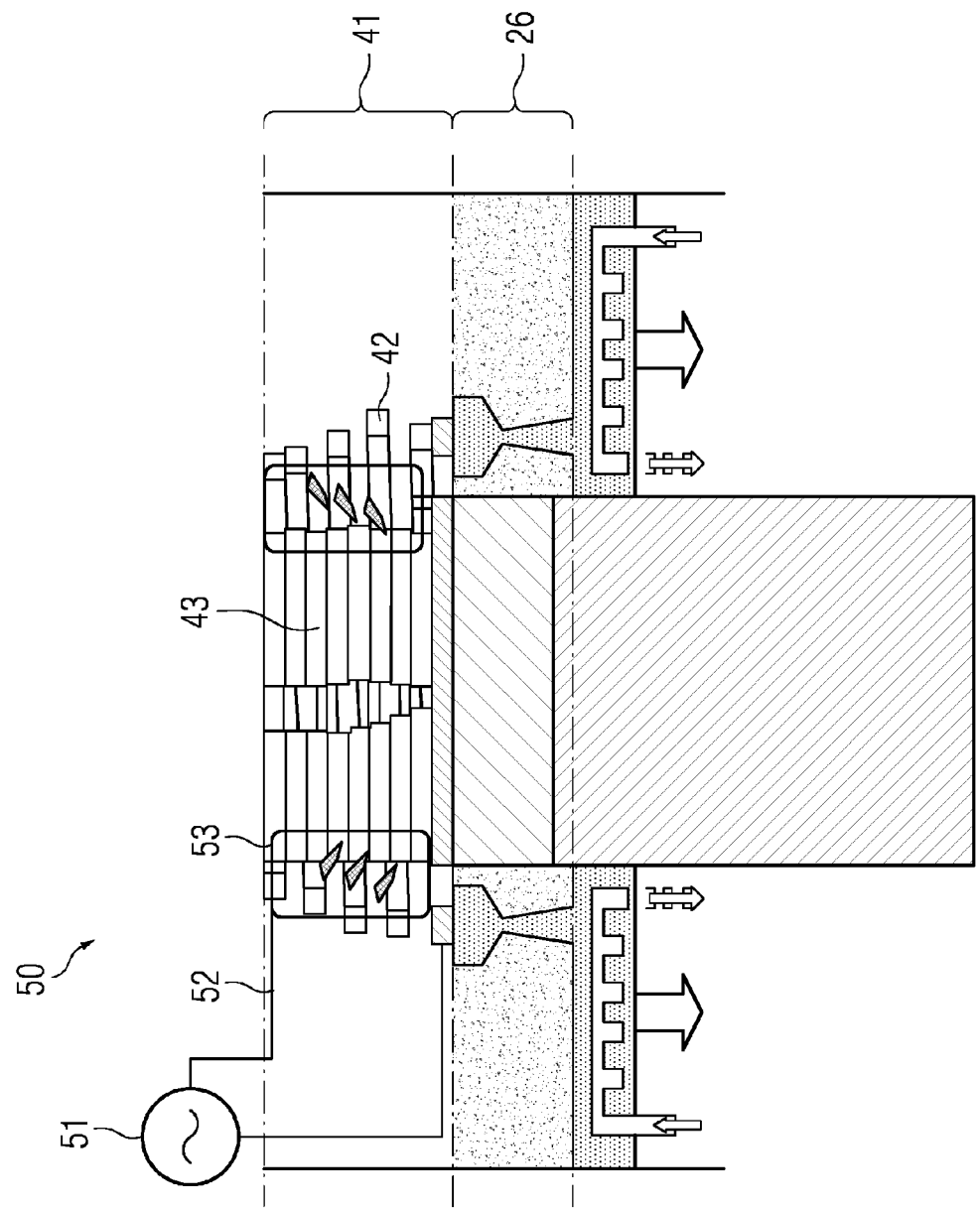
FIG. 5 illustrates the cross section of a SLM process chamber arrangement showing post-SLM heat treatment of the component.

FIG. 5 illustrates the cross section 50 of a SLM process chamber arrangement showing post-SLM heat treatment of the component. The arrangement illustrates SLM set-up for repairs, shown with the same SLM chamber 5 as depicted in FIG. 4, partly emptied from metallic powder 9, till the offset 26. The heat treatment device 42 is connected to an electric power source 51, for example an ac power source. The electric connectors 52, transmits the electric current to the heat treatment device 42. The transmission of energy happens through electro-magnetic induction 53 as shown in the FIG. 5. The post SLM heat treatment is provided after the metallic powder 9 is removed down to the height of the offset 26. During the said process the remaining metallic powder 9 will act as electro magnetic insulator, thereby safeguarding the device 1 to be repaired from any electro-magnetically induced currents. During the said process, the holder 23 is continuously cooled.

Figure 6:
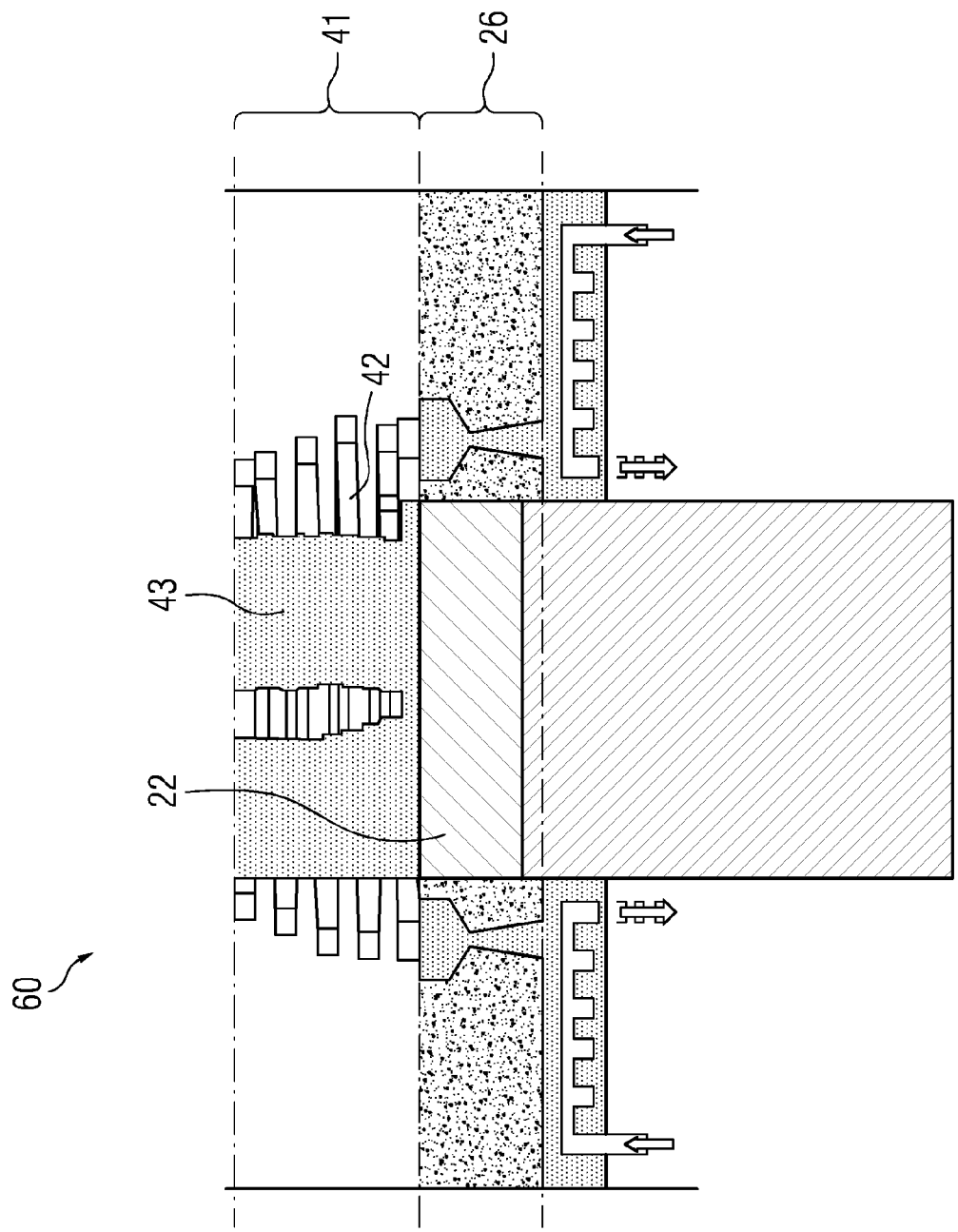
FIG. 6 illustrates the arrangement of the SLM process chamber when the post SLM heat treatment is complete.

FIG. 6 illustrates cross section 60 of a SLM chamber arrangement when the post SLM heat treatment is complete. The arrangement shows the same SLM process chamber 5 as depicted in FIG. 4, completely emptied from metallic powder 9. The electric power source 51 and the electric connectors 52 are also detached from the heat treatment device 42. As long as the device to be repaired is in the SLM process chamber the cooling could be continued. Finally, the component 43 has undergone a beneficial heat treatment and the section 22 has experienced limited heating due to the presence of the holder 23 nearby and its cooling effect on device 1.

FIG. 7 illustrates the repaired device taken out from the SLM chamber 5. Once the heat treatment is over, the heat treatment device 42 is removed from the holder 23 and discarded. The holder could be reused if there is a similar device to be repaired. The metallic surface coating 29 of the extended region 27 of the holder 23 could be machined and renewed prior to reuse. The cooling is switched off while performing the said process. At the end of the SLM process, heat treatment and cooling a repaired component with the intended properties is obtained.

Summarizing, the present invention introduces a method of manufacturing a component by SLM and performing the required heat treatment in the SLM chamber. The method avoids transporting the SLM machined components, devices or products to an alternate environment for the required heat treatment. The proposed invention also provides the required cooling for the regions of a device that needs cooling also, which is again provided within the SLM chamber itself.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

The invention claimed is:

1. A method for manufacturing a component in a selective laser melting chamber arrangement by selective laser melting, comprising:
   building a heat treatment device through a selective laser melting process, adapted to provide a heat treatment to the component as part of the selective laser melting chamber arrangement for manufacturing the component; and
   providing a heat treatment to the component by the heat treatment device.

2. The method according to claim 1, wherein the heat treatment device is spatially positioned in relation to the component, such that the heat treatment device is adapted to provide the heat treatment to the component.

3. The method according to claim 1, wherein the component is made of an electrically and thermally conductive material.

4. The method according to claim 1, wherein the heat treatment device is coil shaped.

5. The method according to claim 4, wherein the coil shaped heat treatment device circumferentially encircles the component.

6. The method according to claim 1, wherein the component is manufactured onto a device, for repairing the device.

7. The method according to claim 6, further comprising: providing cooling to the device by a cooling arrangement.

8. The method according to claim 7, wherein the cooling arrangement further comprises a holder for holding the component and having an integrated cooling channel through which a cooling medium flows.

9. The method according to claim 8, wherein the holder is made of an electrically and magnetically insulating material.

10. The method according to claim 7, wherein cooling is provided to the device during selective laser melting of the component and heat treatment of the component.

11. The method according to claim 1, wherein the heat treatment is provided to the component after selective laser melting of the component.

12. The method according to claim 1, wherein building the heat treatment device comprises supporting a base of the heat treatment device by a holder.

13. The method according to claim 12, wherein supporting the heat treatment device by the holder comprises supporting the heart treatment device at its base by an extended region of the holder, the extended region having a specific height and a flat surface with metallic surface coating encircling the component.

14. The method according to claim 1, wherein the heat treatment is performed in a selective laser melting chamber.

15. The method according to claim 1, wherein the heat treatment is an inductive heat treatment.

16. A method for manufacturing a component in a selective laser melting chamber arrangement by selective laser melting, comprising:
   building a heat treatment device through a selective laser melting process, adapted to provide a heat treatment to the component as part of the selective laser melting chamber arrangement for manufacturing the component;
   providing a heat treatment to the component by the heat treatment device, wherein the component is manufactured onto a device, for repairing the device; and
   providing cooling to the device by a cooling arrangement, wherein the cooling arrangement comprises a holder for holding the component and having an integrated cooling channel through which a cooling medium flows.

17. The method according to claim 16, wherein the holder is made of an electrically and magnetically insulating material.

* * * * *